United States Patent
Reitz et al.

[11] Patent Number: 5,950,524
[45] Date of Patent: Sep. 14, 1999

[54] AIRLOCK ASSEMBLY SUPPORTING A FILTER CARTRIDGE

[76] Inventors: Christopher J. Reitz, 647 Shore Dr., Boynton Beach, Fla. 33435; James Robert Leverentz, 7687 Shady La., Northfield, Ohio 44067

[21] Appl. No.: 09/058,940
[22] Filed: Apr. 13, 1998
[51] Int. Cl.⁶ .................................................. C12G 1/08
[52] U.S. Cl. ........................ 99/277.1; 99/276; 99/277; 99/323.1; 210/474
[58] Field of Search .................. 99/276, 277, 277.1, 99/277.2, 323.1, 278; 210/473, 474, 475, 476; 426/15, 11, 8

[56] References Cited

U.S. PATENT DOCUMENTS

| | | | |
|---|---|---|---|
| 2,181,838 | 11/1939 | Tressler | 99/277.1 X |
| 4,423,670 | 1/1984 | Tressler | 99/277.1 X |
| 4,517,884 | 5/1985 | Tenison | 99/275 |
| 4,842,869 | 6/1989 | Forino | 99/277.1 X |

*Primary Examiner*—Reginald L. Alexander

[57] ABSTRACT

An airlock assembly for allowing fermentation gasses to escape from a sealed fermentation vessel and preventing ambient gasses from entering the fermentation vessel and including structure for supporting an activated charcoal filter, or other filter medium, for absorbing organic by-product gasses of the fermentation process.

9 Claims, 3 Drawing Sheets

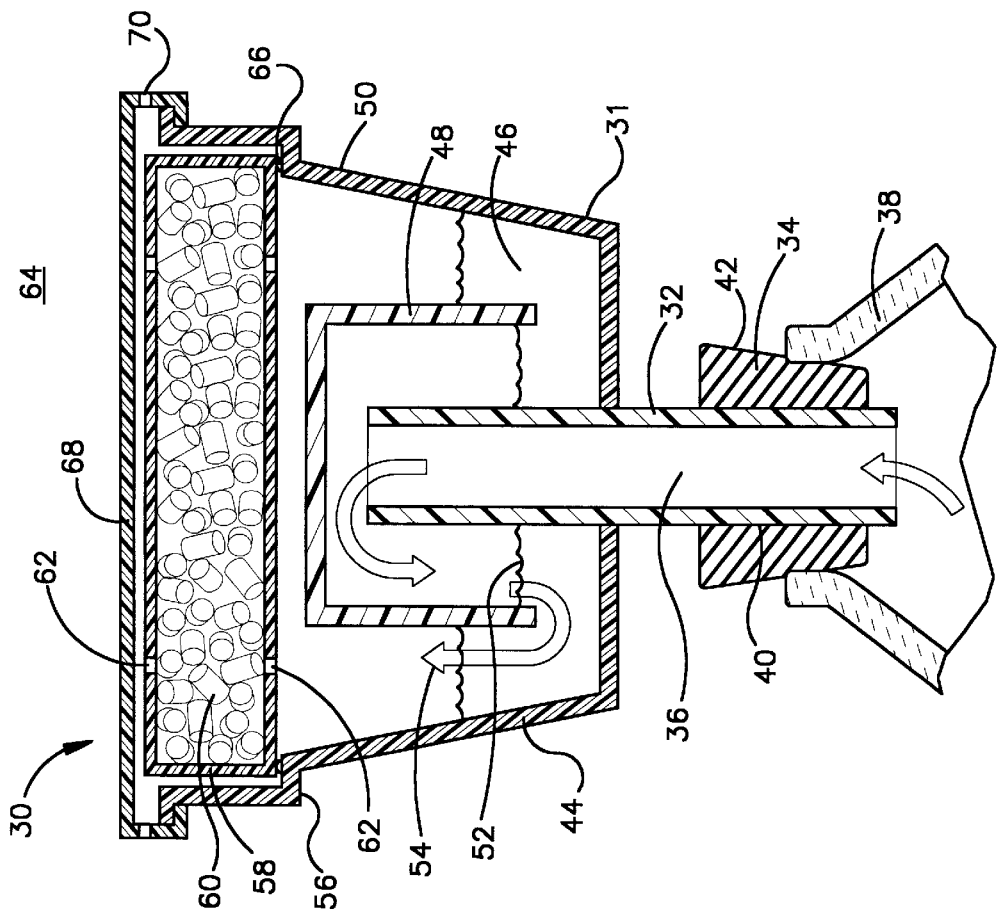
Fig.2
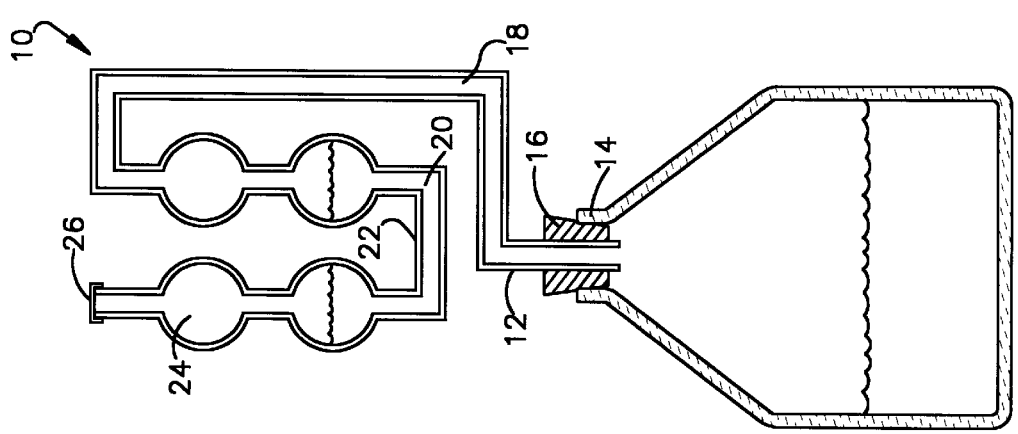
Fig.1 "Prior Art"

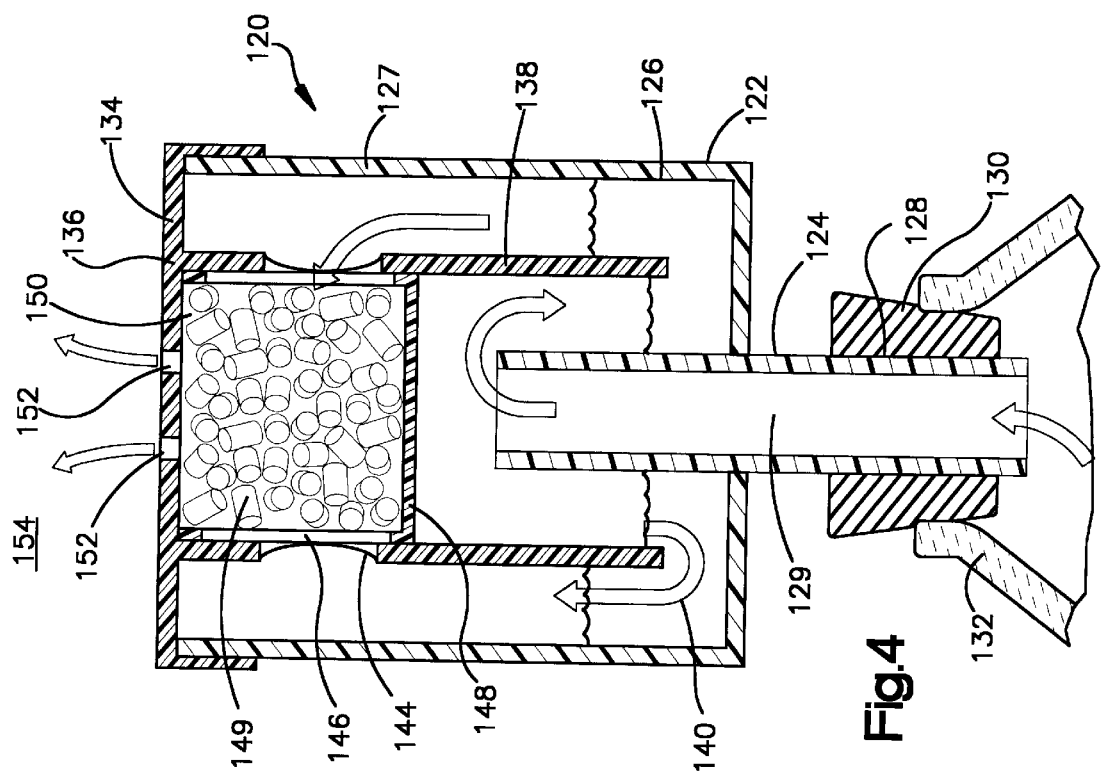
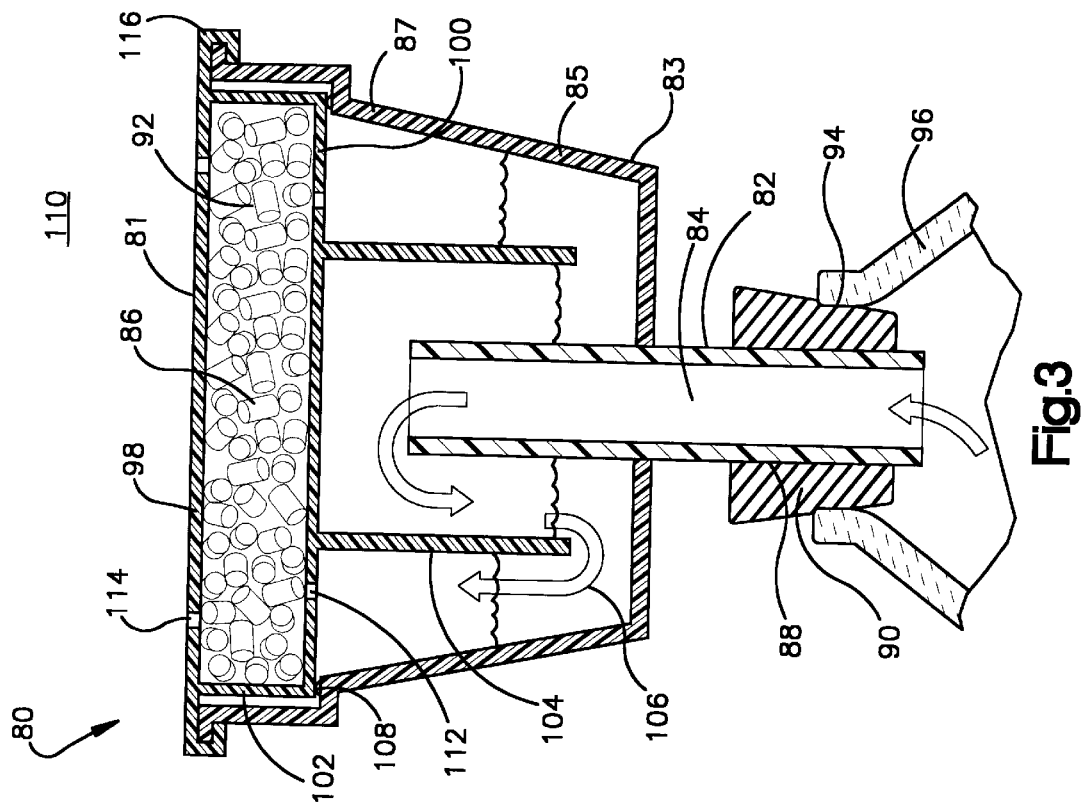

5,950,524

AIRLOCK ASSEMBLY SUPPORTING A FILTER CARTRIDGE

FIELD OF THE INVENTION

The present invention relates to an airlock assembly of the type used to seal the mouth of a vessel containing a fermenting beverage. More particularly to an airlock assembly supporting a filter cartridge useful for absorbing organic byproduct gasses of the fermentation process to prevent such organic byproduct gasses from entering the ambient atmosphere.

BACKGROUND

In the beer making process, the wine making process and the other processes involving fermenting a beverage, the beverage, whether beer or wine, must go through a prolonged fermentation cycle wherein yeast in the beverage converts sugars into alcohol. The fermentation cycle, as a by-product, generates fermentation gasses. Typically the beverage ferments in a closed vessel. To prevent fermentation gases from building up pressure and rupturing the vessel, an air lock is used to allow fermentation gasses to escape without permitting ambient gasses to enter the vessel.

FIG. 1 shows a typical prior art air lock used for home brewing beer, wine, or other fermenting beverage. The air lock 10 includes a tube 12 that extends into the mouth 14 of the fermentation vessel. A cork or rubber stopper 16 with a hole in the center secures the tube to the vessel mouth 14 such that fermentation gases within the vessel can only escape through the tube. The interior of the tube forms an input manifold 18. The air lock also includes a reservoir 20 for holding a fluid such as water. When the reservoir is filled to a fluid depth in excess of the bottom of a partition 22 separating the interior of the input manifold 18 from ambient air, the fermentation gasses can not pass freely under the partition 22 and into ambient air 24. However, as the fermentation process causes the pressure in the input manifold 18 to increase, the increased pressure causes the fluid level on the input manifold side of the partition 22 to drop to the level of the bottom of the partition and the fermentation gasses then escape into ambient air 24 by passing under the partition 22 and bubbling up through the fluid on the ambient air side of the partition. Because the pressure inside the vessel, and inside the input manifold, is always higher than ambient pressure, no ambient air can ever enter the vessel and contaminate the fermenting beverage. A dust cover 26 that does not seal onto the airlock may be used to reduce the quantity of microscopic airborne particles contaminating the fluid.

The problem associated with fermenting beer, wine, or other beverages using known airlocks is that the fermentation gasses, which contain a high concentration of organic gasses, are putrid. Therefore, when these gasses escape into an enclosed room or other living area, the putrid gasses permeate the entire living area crating a fowl smell. There is a need for an airlock that secures or includes an activated charcoal, or other filter medium, filter cartridge for removing these unpleasant organic gasses.

SUMMARY OF THE INVENTION

In accordance with one particular aspect of this invention an airlock is provided for allowing fermentation gasses to escape from the interior of a fermentation vessel containing a fermenting beverage to the ambient atmosphere. The airlock comprises a reservoir for containing a fluid, an input manifold into which fermentation gasses from the vessel enter the airlock, a partition separating the input manifold from an exit manifold and extending into the reservoir such that when the reservoir is filled with fluid gasses can not pass freely from the input manifold to the exit manifold, and a filter support means for securing a filter cartridge such that fermentation gasses in the exit manifold can not pass to ambient without passing through a filter cartridge supported by the filter support means.

In accordance with another aspect the airlock further includes a dust cap to prevent microscopic particles in the ambient atmosphere from contaminating the filter cartridge and/or the fluid in the reservoir.

According to another aspect, the airlock further includes a filter cartridge containing activated charcoal, or other filter medium, for absorbing organic gasses. The filter cartridge and the dust cap may be an integrated unit.

According to yet another aspect of the invention, the dust cap and the partition may be an integrated unit and the dust cap, filter cartridge, and partition may all be an integrated unit.

A cap is provided in accordance with this invention for an airlock of the type including a central tube into which fermentation gasses enter the airlock, a reservoir portion and a mouth portion. Such cap seals over the mouth portion and includes a top portion for sealing over the mouth of the airlock, a central extension portion including an upper part and a lower part, the lower part extending into the reservoir and forming a partition and the upper part sized to sealably secure a filter cartridge.

The invention further includes a filter cap for an airlock including a top portion for sealing over the mouth of the airlock, a central extension portion including an upper part and a lower part, the lower part extending into the reservoir and forming a partition and the upper part includes a filter chamber for holding a filter material, the upper part also includes an aperture for enabling fermentation gasses to pass into the filter chamber and an aperture for allowing gasses to escape from the chamber to ambient.

BRIEF DESCRIPTION OF THE DRAWINGS

FIG. 1 shows a cross section view of a known airlock.

FIG. 2 shows a cross section view of a first embodiment airlock in accordance with this invention.

FIG. 3 shows a cross section view of a second embodiment airlock in accordance with this invention.

FIG. 4 shows a cross section view of yet a third embodiment airlock in accordance with this invention.

DETAILED DESCRIPTION

Figure 5A:
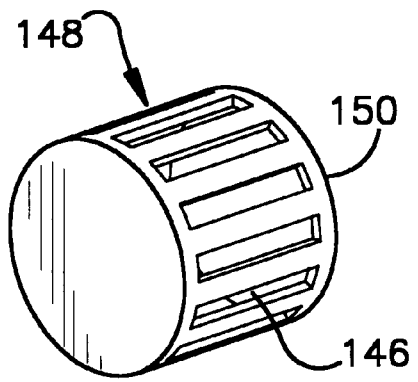
FIG. 5A shows a perspective view of a filter cartridge usable in at least the third embodiment airlock in accordance with this invention.

The present invention will now be described with reference to the drawings. FIG. 2 shows a cross section view of a first embodiment air lock assembly 30 in accordance with this invention. Air lock assembly 30 includes a base portion 31 that is preferably made of a rigid plastic. Base portion 31 includes input manifold tube portion 32, reservoir portion 44 and mouth portion 50. A cork or rubber stopper 34 seals the input manifold tube portion 32 to the mouth of the fermentation vessel 38. The exterior of the tube wall seals against the sides of an aperture 40 in the center of the stopper 34 and the exterior of the stopper 42 seals into the mouth of the vessel 38. Therefore, gasses in the fermentation vessel can only enter the interior 36 of the input manifold tube portion 32. The fluid reservoir portion 44 holds a fluid 46 such as water. A partition 48, shaped as an upside down cup, extends downwardly into the fluid 46 thereby preventing fermentation gasses in the interior of the input manifold tube portion 36 from passing to the mouth portion 50 until the pressure of the fermenting gasses builds to a pressure such that the fluid level on the input manifold side of the partition 48 drops to the level of the partition and the fermentation gasses pass under the partition and bouble up through the fluid on the mouth side of the partition 50 as shown by arrow 54.

The mouth portion 50 includes filter support structure 56 which supports a filter cartridge 58 containing activated charcoal, or other filter medium, 60 in a gas permeable container (shown by openings 62) such that the cartridge substantially obstructs the entire opening between the mouth portion 50 and the ambient atmosphere 64. Seals 66 may be used to prevent any fermentation gasses from passing to the ambient atmosphere 64 without passing through the filter cartridge 58. A dust cap 68 may be used to secure the cartridge to the support structure. The dust cap 68 must be gas permeable or non-sealed to the filter support structure 56 such that fermentation gasses may escape from the filter cartridge 58 to the ambient atmosphere 64. In this embodiment of FIG. 2, the non-sealed feature is shown by openings 70 and the dust cap 68 non-sealably secures to the filter support structure 56 by a common bayonet type of mount.

FIG. 3 shows a cross section of a first alternative embodiment of an airlock assembly 80 in accordance with this invention. This alternative airlock assembly 80 functions similarly to airlock assembly 30 shown in FIG. 2 except that the dust cap, filter cartridge, and partition are integrated into a single cap unit 81 as will be discussed.

Airlock assembly 80 includes a base portion 83 that again is preferably made of a rigid plastic. Base portion 83 includes input manifold tube portion 82, reservoir portion 85 and mouth portion 87. A cork or rubber stopper 90 seals the input manifold tube portion 82 to the mouth 94 of the fermentation vessel 96. The exterior of the tube wall 88 seals against the sides of an aperture in the center of the stopper 90 and the exterior of the stopper 90 seals into the mouth 94 of the vessel 96. Therefore, gasses in the fermentation vessel can only enter the interior 84 of the input manifold tube portion 82.

The cap unit 81 includes a filter chamber 86 defined by a top wall 98, bottom wall 100, and a side wall 102, a partition portion 104, again shaped as an upside down cup, extends downward into the reservoir portion 85 of the base portion 83. Again, fermentation gasses in the input manifold tube portion 82 can not escape until pressure builds to a point where the gasses pass under the partition portion 104 and bubble through the fluid into the mouth portion 87.

Mouth portion 87 includes sealing structure 108 which seals against the cap unit 81 such that gasses in the mouth portion can only enter the filter chamber 86 through apertures 112 in the bottom wall 100 of the filter chamber 86. Gasses in the filter chamber 86 may escape into ambient atmosphere 110 through apertures 114 in the top wall of the filter chamber 86. A typical bayonet mounting structure 116 may be used to secure the cap unit to the base unit. It is envisioned that when the filter material 87, such as activated charcoal, within the filter chamber becomes saturated and is no longer functioning to remove the putrid organic material from the fermentation gasses, the entire cap unit 81 will be replaced.

FIG. 4 shows a second alternative embodiment air lock assembly 120 in accordance with this invention. The airlock assembly 120 includes a rigid plastic base portion 122 with an integrated input manifold tube portion 124, reservoir portion 126, and mouth portion 127. Again, the tube portion 124 seals against an aperture 128 in a cork or rubber stopper 130. The cork or rubber stopper 130 seals against the mouth 132 of the fermentation vessel such that fermentation gasses within the fermentation vessel can only enter the interior 129 of the input manifold tube portion 124. A flexible plastic or rubber cap unit 134, shown in more detail in FIGS. 5B and 5C, fits securely over the mouth portion 127 of base portion 122 with a slight interference friction fit to prevent gasses from escaping between the cap 134 and the mouth 127. The cap unit 134 includes a top wall 136 and a downwardly extending partition portion 138 that extends into the fluid in the reservoir portion 126. Again, fermentation gasses can only escape the interior of the input manifold tube portion 124 by bubbling under the partition.

Figure 5B:
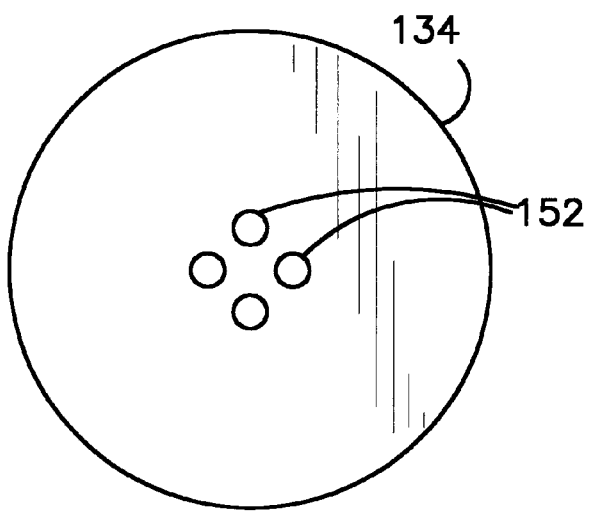
FIG. 5B shows a top view of an integrated dust cap and partition assembly useful in at least the third embodiment airlock in accordance with this invention.
Figure 5C:
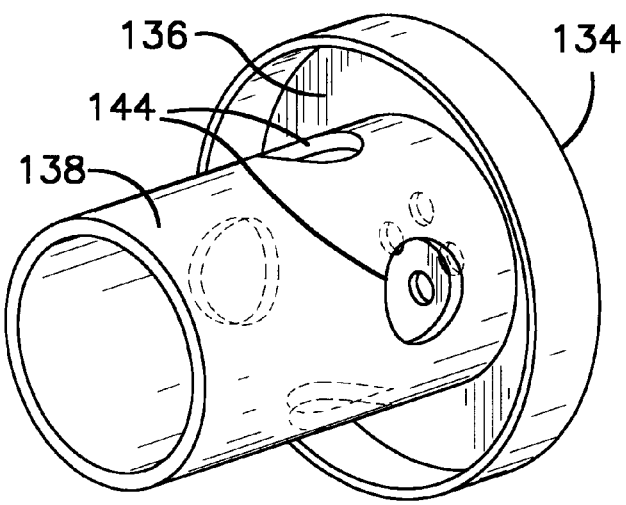
FIG. 5C shows a perspective view of the integrated dust cap and partition assembly of FIG. 5B.

A rigid plastic filter cartridge 148, shown in more detail in FIG. 5A, sealably fits into the top of the partition portion 138 by a slight interference friction fit. Apertures 144 in the top of partition portion align with apertures 146 in the filter cartridge 148 such that gasses may enter the filter cartridge 148 and aperture 150 in the filter cartridge aligns with apertures 152 in the top wall 136 such that fermentation gasses can escape from the filter cartridge 148 into ambient 154.

What has been described above are preferred embodiments of the present invention. It is, of course, not possible to described every conceivable combination of components or methodologies for purposes of describing the present invention, but one of ordinary skill in the art will recognize that many further combinations and permutations of the present invention are possible. More particularly, although various embodiments and components and features therein have been described, it is to be appreciated that components and/or features of one particular embodiment may be incorporated into another embodiment. The present invention is intended to embrace all such alterations, modifications and variations that fall within the spirit and scope of the appended claims.

What is claimed is:

1. An airlock for allowing fermentation gasses to escape from the interior of a fermentation vessel containing a fermenting beverage to the ambient atmosphere, the airlock comprising:

a) a reservoir for containing a fluid;

b) an input manifold into which fermentation gasses from the vessel enter the airlock;

c) a partition separating the input manifold from an exit manifold and extending into the reservoir such that when the reservoir is filled with fluid gasses can not pass freely from the input manifold to the exit manifold;

d) filter support means for securing a filter cartridge such that fermentation gasses in the exit manifold can not pass to ambient without passing through a filter cartridge supported by the filter support means.

2. The airlock of claim 1 further including a dust cap to prevent microscopic particles in the ambient atmosphere from contaminating at least one of the filter cartridge and the fluid in the reservoir.

3. The airlock of claim 2 further including a filter cartridge including activated charcoal for absorbing organic gasses.

4. The airlock of claim 3 wherein the filter cartridge and the dust cap are an integrated unit.

5. The airlock of claim 2 wherein the dust cap and the partition are an integrated unit.

6. The airlock of claim 5 including a filter cartridge including activated charcoal for absorbing organic gasses and the filter cartridge, dust cap, and partition are an integrated unit.

7. The airlock of claim 5 wherein the integrated partition and dust cap unit is a flexible plastic material that secures a filter cartridge by an interference friction fit.

8. A cap for an airlock including a central tube into which fermentation gasses enter the airlock, a reservoir portion and a mouth portion, such cap for sealing over the mouth portion and comprising:

a) a top portion for sealing over the mouth of the airlock;

b) a central extension portion including an upper part and a lower part, the lower part extending into the reservoir and forming a partition and the upper part sized to sealably secure a filter cartridge, the upper part also including an aperture for enabling fermentation gasses to pass into the filter cartridge; and c) the top portion of the cap including an aperture to allow gasses to escape from the filter cartridge to ambient.

9. A filter cap for an airlock including a central tube into which fermentation gasses enter the airlock, a reservoir portion and a mouth portion, such cap for sealing over the mouth portion and comprising:

a) a top portion for sealing over the mouth of the airlock;

b) a central extension portion including an upper part and a lower part, the lower part extending into the reservoir and forming a partition and the upper part including a filter chamber for holding a filter material, the upper part also including an aperture for; enabling fermentation gasses to pass into the filter chamber and to escape from the chamber to ambient.

* * * * *